United States Patent
Kishi et al.

(10) Patent No.: US 7,487,288 B2
(45) Date of Patent: Feb. 3, 2009

(54) DYNAMIC LOADING OF VIRTUAL VOLUME DATA IN A VIRTUAL TAPE SERVER

(75) Inventors: Gregory Tad Kishi, Oro Valley, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 10/845,699

(22) Filed: May 14, 2004

(65) Prior Publication Data

US 2005/0256999 A1    Nov. 17, 2005

(51) Int. Cl.
G06F 12/00    (2006.01)

(52) U.S. Cl. .................... 711/112; 711/4; 711/111; 711/170

(58) Field of Classification Search .................. None
See application file for complete search history.

(56) References Cited

U.S. PATENT DOCUMENTS

| | | | |
|---|---|---|---|
| 6,058,455 A | 5/2000 | Islam et al. | |
| 6,289,398 B1 | 9/2001 | Stallmo et al. | |
| 6,341,329 B1 | 1/2002 | LeCrone et al. | |
| 6,502,108 B1 | 12/2002 | Day, III et al. | |
| 6,553,487 B1 * | 4/2003 | Sukonik et al. | 712/228 |
| 6,629,189 B1 | 9/2003 | Sandstrom et al. | |
| 2002/0053009 A1 | 5/2002 | Selkirk et al. | 711/162 |
| 2002/0178335 A1 | 11/2002 | Selkirk et al. | 711/162 |
| 2003/0196036 A1 | 10/2003 | Gibble et al. | 711/111 |
| 2003/0221076 A1 | 11/2003 | Milligan et al. | 711/165 |
| 2004/0044825 A1 | 3/2004 | Fisher et al. | |
| 2004/0044826 A1 | 3/2004 | Dawson et al. | |
| 2004/0044827 A1 | 3/2004 | Carlson et al. | |
| 2004/0044829 A1 | 3/2004 | Dawson et al. | |
| 2004/0044843 A1 | 3/2004 | Dawson et al. | |
| 2004/0044845 A1 | 3/2004 | Gibble et al. | |
| 2004/0044851 A1 * | 3/2004 | Dawson et al. | 711/154 |
| 2004/0044860 A1 | 3/2004 | Gibble et al. | 711/160 |

FOREIGN PATENT DOCUMENTS

WO    WO 03/014909 A2    2/2003

\* cited by examiner

*Primary Examiner*—Jasmine Song
*Assistant Examiner*—Kaushikkumar Patel

(57) ABSTRACT

Disclosed are a system, a method, and article of manufacture to provide for obtaining data storage device specific information from a data storage device using standard read/write commands. This method uses a host application to write a unique sequence of records to a logical volume of the data storage device. The data storage device detects the unique sequence of records for the logical volume and writes device specific information to the logical volume allowing the host application the ability to read the data storage device specific information using a read command for the logical volume.

11 Claims, 7 Drawing Sheets

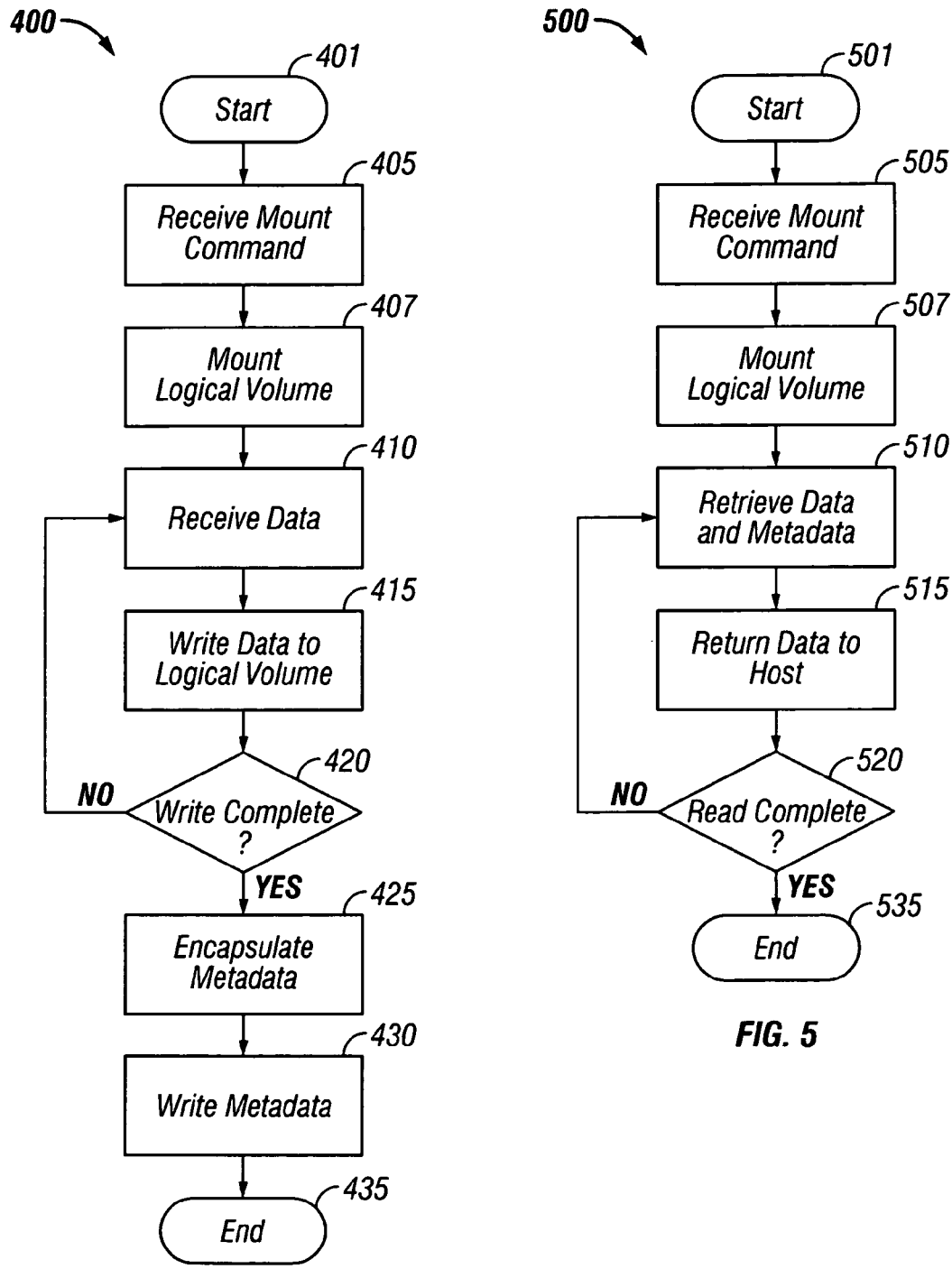

DYNAMIC LOADING OF VIRTUAL VOLUME DATA IN A VIRTUAL TAPE SERVER

TECHNICAL FIELD

The present invention relates generally to the retrieval of storage controller specific data by host applications from virtual tape servers. The retrieval of storage controller specific data is accomplished using the data path between the host computer and the virtual tape server.

BACKGROUND OF THE INVENTION

Virtual tape storage systems use hard disk drive storage to emulate tape drives and tape cartridges. For example, host systems perform input/output (I/O) operations with respect to a tape library by performing I/O operations with respect to a set of hard disk drives that emulate the tape library. In prior art virtual tape storage systems, such as the International Business Machines (IBM) Magstar® Virtual Tape Server, at least one virtual tape server (VTS) is coupled to a tape library comprising numerous tape drives and tape cartridges. The VTS is also coupled to a direct access storage device (DASD), comprised of numerous interconnected hard disk drives.

The DASD functions as a cache to volumes in the tape library. In VTS operations, the VTS processes the host's requests to access a volume in the tape library and returns data for such requests, if possible, from the cache. If the volume is not in the cache, then the VTS recalls the volume from the tape library to the cache, i.e., the VTS transfers data from the tape library to the cache. The VTS can respond to host requests for volumes that are present in the cache substantially faster than requests for volumes that have to be recalled from the tape library to the cache.

Because the cache can satisfy requests faster than the tape library, I/O requests can be satisfied faster if frequently accessed volumes are kept in the cache. However, since the capacity of the cache is relatively small when compared to the tape library, not all volumes can be kept in the cache. Hence, the VTS also premigrates volumes from the cache to the tape library, i.e., the VTS transfers data from the cache to the tape cartridges in the tape library. The process of transferring data from the cache to the tape cartridges is referred to as premigration. Eventually, these premigrated volumes will be removed from the cache and shortened to a pointer that points to the data on tape cartridges, freeing space in the cache for new data. This shortening, or "imigration," operation is very fast, and the performance bottleneck in the VTS is the premigration operation itself.

In general, applications running on a host computer use a data path to read and write data to a storage device. In VTS operations with the host, the data path is used to read and write data with respect to data storage associated with the VTS. If the application (i.e. running on the host) needs device information about the data storage device (i.e. VTS), special applications have to be written to use other special paths to obtain the device information. For example in an AIX application, reads and writes are used to transfer application data and IOCTLSs (input and output control commands to specific AIX device drivers) are required to obtain device specific information.

In general, the special paths used to obtain device information are device specific, whereas the data path commands typically are not device specific. This makes applications that obtain device information less mobile between hardware platforms, making the applications more costly to maintain. In addition, data path commands have a fixed format for the data sent and to be returned, requiring a coordination of changes between the host application requesting the data, the operating system of the host that controls I/O devices and the storage device handling the request anytime additional information is needed from the data storage device. It is also inefficient to use the data path command method to obtain information from the storage device when the nature of the data has a high degree of variability in it. For example, if the storage device is an automated tape library and the information being requested is a list of the tapes stored in that library, that list could contain just a few hundred entries for a small library configuration or hundreds of thousands of entries for a large virtual library. Data path commands are not capable of handling an entirely variable amount of data easily. Typically, the data path command to obtain the information is designed to obtain one tape identifier at a time or some fixed multiple of tape identifiers, for example, one hundred tape identifiers. While obtaining a hundred at a time may work well for small libraries, the overhead of the hundreds of commands that would be necessary to obtain the information for a large library is excessive. What is required is a method to obtain device specific information from a data storage device that uses the standard host computer data path and read/write commands. Therefore there is a need for an improved method to obtain specific information from a storage device that uses the standard host computer data path and read/write commands.

SUMMARY OF THE INVENTION

The present invention provides a system and a method for obtaining data storage device specific information from a data storage device using standard read/write commands. This method uses a host application to write a unique sequence of records to a logical volume of the data storage device. The data storage device detects the unique sequence of records for the logical volume and writes device specific information to the logical volume allowing the host application the ability to read the data storage device specific information using a read command for the logical volume.

In method form, exemplary embodiments include a method for obtaining information from a data storage device, including writing data comprising a unique sequence of records to a logical volume on the data storage device. The data storage device analyzes the data written to the logical volume to detect the unique sequence of records. In response to the data storage device detecting the unique sequence of records on the logical volume, the data storage device writes data storage device specific information on the logical volume, the data storage device mounts the logical volume and reads the device specific information from the logical volume.

Another exemplary method embodiment includes a method for obtaining information from a data storage device, including writing data comprising a unique sequence of records to a logical volume on the data storage device. The data storage device analyzes the data written to the logical volume to detect the unique sequence of records. In response to the data storage device detecting the unique sequence of records on the logical volume, the data storage device places a device specific information data request flag in a metadata associated with the logical volume to indicate that the logical volume comprises device specific information. The data storage device receives a request to mount the logical volume and reads the metadata. In response to the data storage device detecting the device specific information data request flag in the metadata, the data storage device verifies that the logical volume is a special data request logical volume and writes device specific information on the logical volume. The data storage device reads the device specific information from the logical volume and provides the device specific information to a host computer.

In system embodiments the present invention provides a system for obtaining information from a device, including a host computer, a data storage device comprising: a cache memory; a logical volume; a central processing unit for controlling the data storage device and a host computer interface coupled to the host computer for interfacing the data storage device to the host computer. The host computer writes data comprising a unique sequence of records to the logical volume on the data storage device. The data storage device analyzes the data written to the logical volume to detect the unique sequence of records and in response to the data storage device detecting the unique sequence of records on the logical volume, the data storage device writes data storage device specific information on the logical volume. The data storage device mounts the logical volume and reads the device specific information from the logical volume. The data storage device provides the device specific information to the host computer.

It will be appreciated by those skilled in the art that although the following detailed description will proceed with reference being made to preferred embodiments and methods of use, the present invention is not intended to be limited to these preferred embodiments and methods of use. Rather, the present invention is intended to be limited only as set forth in the accompanying claims For a more detailed understanding of the present invention, reference may be made to the following detailed description taken in conjunction with the accompanying drawings.

BRIEF DESCRIPTION OF THE DRAWINGS

Referring now to the drawings in which like reference numbers represent corresponding parts throughout:

FIG. 4 illustrates a flowchart of a process to write data to a data storage device.

FIG. 5 illustrates a flowchart of a process to read data from a data storage device.

DETAILED DESCRIPTION OF THE PREFERRED EMBODIMENTS

The present invention is described in preferred embodiments in the following description. The preferred embodiments are described with reference to the Figures. While the present invention is described in conjunction with the preferred embodiments, it will be appreciated by those skilled in the art that it is intended to cover alternatives, modifications, and equivalents as may be included within the spirit and scope of the invention as defined by the appended claims.

Figure 1:
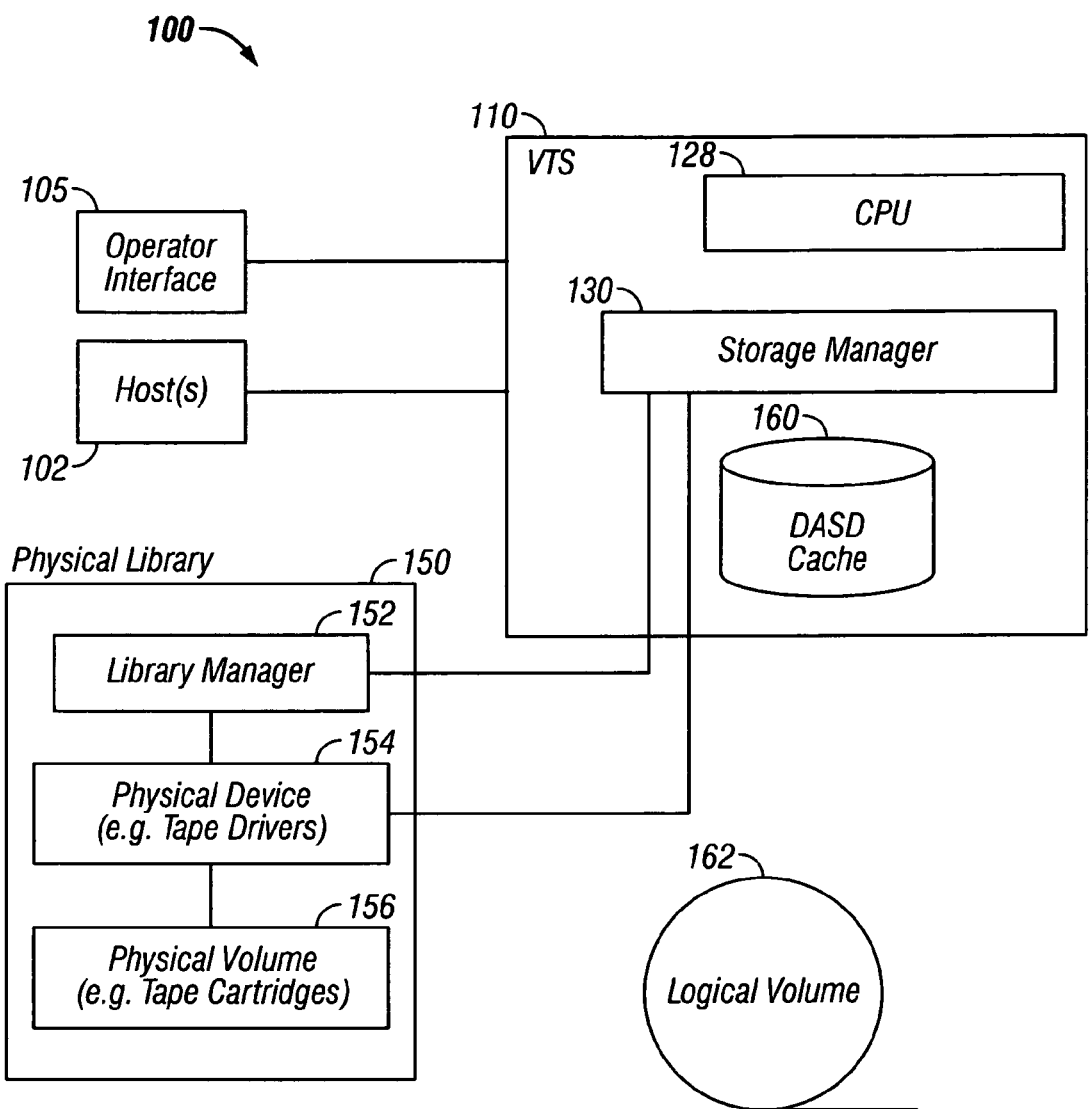
FIG. 1 illustrates, in a block diagram, a computing environment in accordance with an implementation of the present invention.

FIG. 1 illustrates, in a block diagram, a computing environment 100 in accordance with an embodiment of the present invention. A Virtual Tape Server (VTS) 110 emulates virtual tapes as files on a direct access storage device (DASD) cache 160. Additional VTSs may be deployed, but for purposes of illustration, a single VTS 110 is shown. The VTS 110 is any server computational device known in the art and includes any operating system known in the art. For instance, in certain implementations of the invention, the VTS 110 may be implemented in one or more computers comprising an IBM RS/6000® system, IBM P series® and include the IBM AIX® operating system.

One or more hosts 102 and one or more operator interfaces 105 connect to the VTS 110. The hosts 102 and operator interfaces 105 may be any computational device known in the art, such as a personal computer, a workstation, a server, a mainframe, a hand held computer, a palm top computer, a telephony device, network appliance, etc. The hosts 102 and operator interfaces 105 may include any operating system known in the art, such as the IBM OS/390** operating system.

The VTS 110 includes at least one central processing unit (CPU) 128 for controlling VTS 110 and an application, such as a storage manager 130 that optimizes storage utilization. The storage manager 130 may be implemented either as a standalone application or as a part of one or more other applications. The storage manager 130 controls access to a cache memory (i.e. cache 160), such as a DASD file buffer, and a physical library 150, such as an automated data storage library. In certain implementations, the storage manager 130 may include software to utilize an automated data storage library, such as the IBM Magstar®Virtual Tape Server and the IBM ADSTAR Distributed Management (ADSM) software or Tivoli® Storage Manager. The storage manager 130 may perform data movement operations between the hosts 102, the cache 160, and the physical library 150. Further details of the VTS technology are described in the IBM publication "TotalStorage® Peer-to-Peer Virtual Tape Server Planning and Implementation Guide," IBM document no. SG24-6115-02 (Copyright IBM, 2004).

The physical library 150 may comprise an IBM Magstar® Tape Library, such as the Magstar® 3494 Tape Library, or any other automated data storage library system known in the art. In certain implementations, the physical library 150 comprises numerous physical devices 154, such as tape drives, CD ROM drives, DVD ROM drives, etc. that provide access to physical volumes 156. In certain implementations, the VTS 110 provides the image of up to 256 tape drives 154 (e.g., 3490 tape drives from IBM).

Cache 160 may comprise numerous interconnected hard disk drives. Cache 160 stores logical volumes 162. In certain implementations, logical volumes 162 are not organized into pools, although the physical volumes 156 may be organized into pools. Moreover, the logical volumes 162 may be stored anywhere in cache. Cache 160 improves performance by allowing host I/O requests from the hosts 102 to the physical library 150 to be serviced from the faster accessible cache 160 as opposed to the slower accessible physical library 150. The disks in the cache may be arranged as a Direct Access Storage Device (DASD), Just a Bunch of Disks (JBOD), Redundant Array of Inexpensive Disks (RAID), etc.

Host(s) 102 exchange tape operations with the VTS 110. The execution of the tape operations retrieves data from or stores data into logical volumes 162 stored in the cache 160. The VTS automatically premigrates (i.e., offloads) logical volumes 162 in cache 160 after the logical volumes have been accessed by host(s) 102 onto physical volumes 156. In certain implementations, the least recently used (LRU) logical volume 162 is transferred before other logical volumes 162. If one of the hosts 102 requires a logical volume 162 that is not in the cache 160, the storage manager 130 of the VTS 110 commands the tape library 150 to mount the appropriate physical volume 156 into a physical device 154. Then, the required data is copied from the physical volume 156 as a logical volume 162 in the cache 160 (i.e., the data is recalled).

Figure 2:
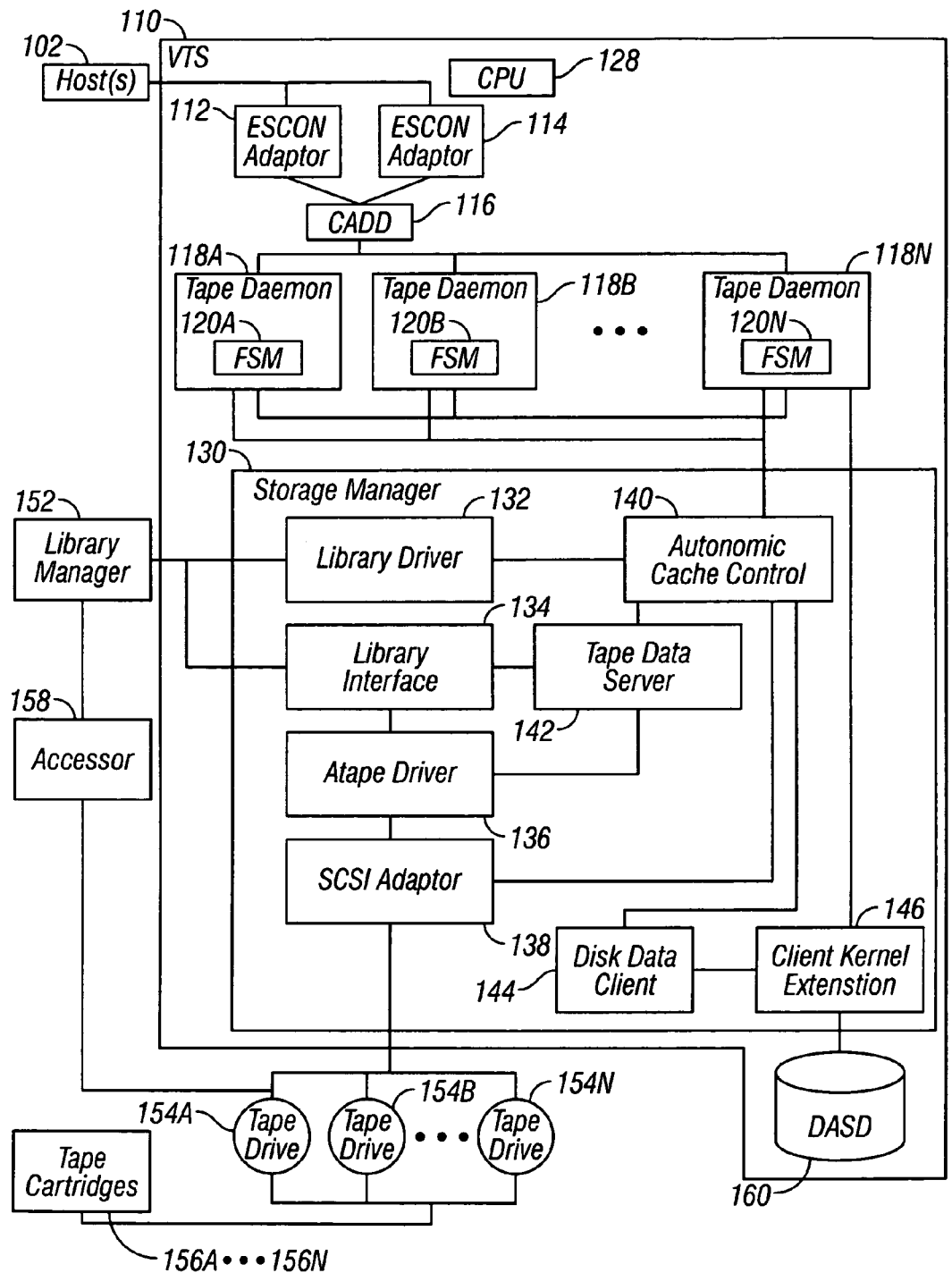
FIG. 2 illustrates, in a block diagram, further details of a computing environment in accordance with an implementation of the present invention.

FIG. 2 illustrates, in a block diagram, further details of a computing environment in accordance with one embodiment of the present invention. A host computer interface coupled to host(s) 102 for interfacing the data storage device (i.e. VTS 110) to host(s) 102 is used for communicating with the data storage device. Various host computer interfaces may be used, such as Enterprise System Connection (ESCON)® adaptors 112 and 114 or any other switching mechanism known in the art (e.g., fibre channel, Storage Area Network (SAN) interconnections, etc.). CADD 116 is a device driver for tape daemons 118A . . . 118N. Tape daemons 118A . . . 118N receive read and write tape operations from host(s) 102 through one or more host computer interfaces. For a write operation, the tape daemons 118A . . . 118N receive data, create logical volumes 162, and write the logical volumes 162 as files in cache 160. For read operations, the tape daemons 118A . . . 118N access the cache 160 to retrieve data through client kernel extension 146 and return the data to hosts 102. Host(s) 102 operate as if they are communicating with physical tape drives, rather than with the tape daemons 118A . . . 118N, which emulate the physical tape drives. Each tape daemon 118A . . . 118N includes a file system manager (FSM) 120A . . . 120N that is used to access files in cache 160.

The storage manager 130 transfers data from cache 160 to tape drives 154A . . . 154N. In one embodiment, the storage manager 130 includes multiple components, as illustrated in FIG. 2. The autonomic cache control 140 controls the transfer of data from cache 160 to tape drives 154A . . . 154N. Additionally, the autonomic cache control 140 controls the rate at which the tape daemons 118A . . . 118N write data to the cache 160.

In particular, the autonomic cache control 140 receives notification from one of the hosts 102 to transfer data. Host(s) 102 indicate which logical volumes 162 are to be placed into particular pools of tape cartridges 156A . . . 156N. Moreover, the autonomic cache control 140 maintains metadata on which files are stored in cache 160. The autonomic cache control 140 notifies the disk data client 144 to transfer data. The disk data client 144 requests data from the client kernel extension 146, which retrieves the requested data from cache 160 and forwards the data to disk data client 144. The disk data client 144 forwards the data to tape data server 142 at the request of the autonomic cache control 140.

The tape data server controls the writing of data to tape drives 154 . . . 154N. The data is sent from tape data server to Atape driver 136 to SCSI adaptor 138 and to the tape drives 154A . . . 1154N. The tape data server uses a library interface 134 to tell the library manager 152 which tape cartridge 154 is to be put into one of the tape drives. The autonomic cache control 140 sends messages to the library manager 152 through the library driver 132.

The library manager 152 manages the mounting and unmounting of the tape cartridges 156A . . . 154N from the tape drives 154A . . . 154N. The autonomic cache control 140 selects the appropriate physical tape cartridge 156 to mount based on its association with the logical volume 162 being accessed or written. When the library manager 152 receives a notification to mount or unmount a tape cartridge 154, the library manager 152 notifies the accessor 158, which is used to access the tape drives 154A . . . 154N. The accessor 158 mounts and unmounts tape drives 154A . . . 154N.

Figure 3:
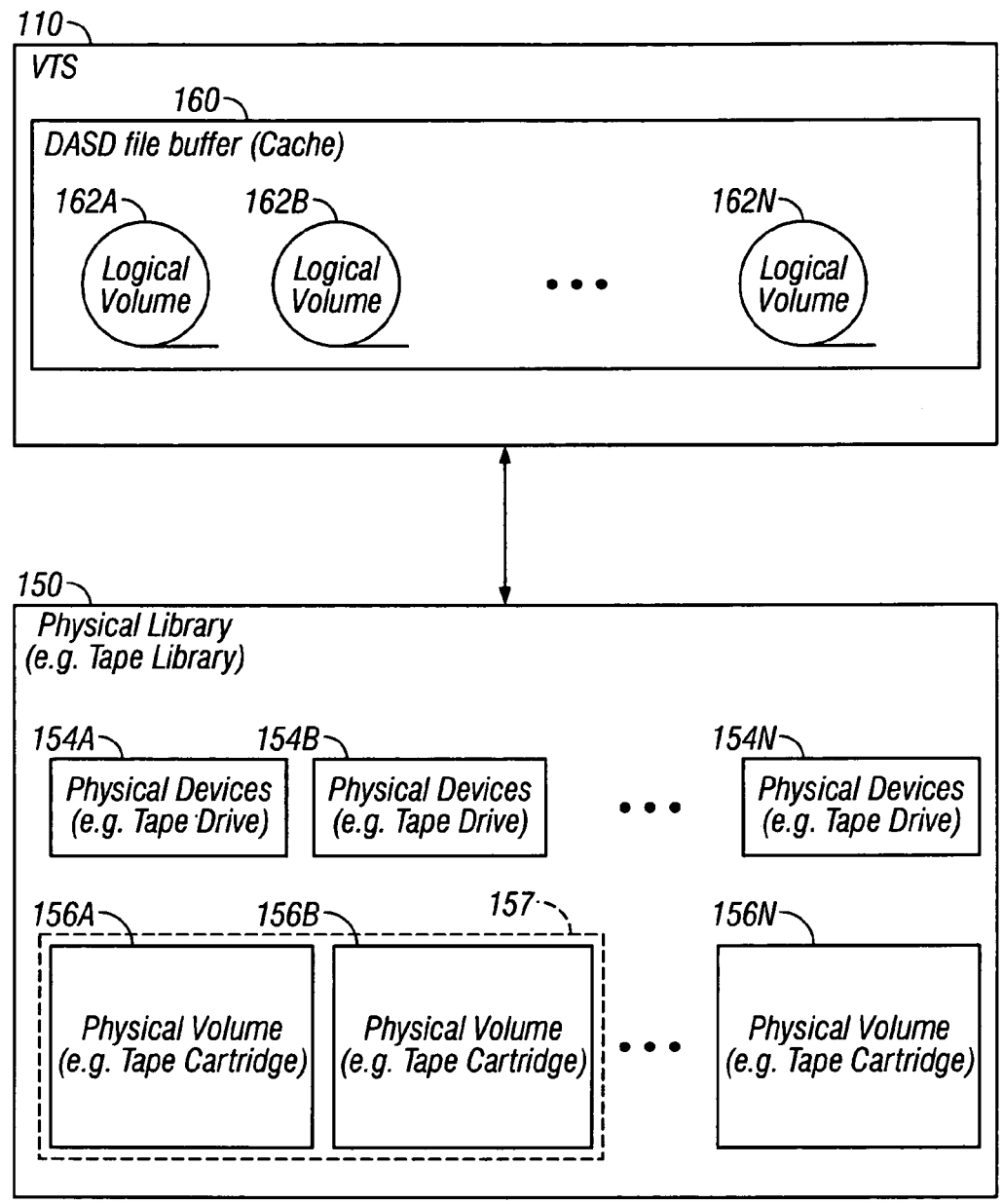
FIG. 3 illustrates a block diagram including a virtual tape server, a cache, and a physical library in accordance with certain implementations of the invention.

FIG. 3 illustrates a block diagram including VTS 110, cache 160 and physical library 150, in accordance with one embodiment of the present invention. Physical library 150, in addition to including physical devices 154A . . . 154N, includes physical volumes 156A . . . 156N. A physical volume 156A . . . 156N may be mounted on any of the physical devices 154A . . . 154N. In certain implementations the physical volumes 156A . . . 156N are tape cartridges that may be mounted via mechanical mounting onto the physical devices 154A . . . 154N that are tape drives. In alternative implementations the physical volumes 156A . . . 156N may be CD ROMs, DVDs or other storage media. In certain implementations, the number of physical volumes 156A . . . 156N are larger than the number of physical devices 154A . . . 154N. The physical volumes 154A . . . 154N may be organized into pools. For example, physical volumes 156A and 156B may be in pool 157.

The operations occurring between cache 160 and physical devices 154A . . . 154N are premigration (i.e., the transfer of data from the cache 160 to the physical volumes 156A . . . 156N) and recall (i.e., the transfer of data from the physical volumes 156A . . . 156N to the cache 160). A typical data file size is 100-200 megabytes. In one embodiment, the VTS 110 provides an N:1 ratio, where N is typically 10-20 of logical devices to physical devices 154A . . . 154N. In such implementations, since there are more physical volumes 156A . . . 156N (corresponding to the logical volumes 162 stored in the logical devices) than physical devices 154A . . . 154N, there may be time periods when the VTS 110 has more physical volumes 156A . . . 156N to be mounted for recalls than there are physical devices 154A . . . 154N in the VTS 110. As a result, physical volumes 156A . . . 156N may need to be unmounted so that other physical volumes 156A . . . 156N may be mounted.

When a host 102 requests a logical volume from the VTS 110, a cache hit occurs if the logical volume is resident in the cache 160. If the logical volume is not resident in the cache, the storage manager 130 determines whether the corresponding physical volume 156A . . . 156N is mounted on one of the physical devices 154A . . . 154N. If the corresponding physical volume 156A . . . 156N is not mounted then the storage manager 130 mounts the corresponding physical volume 156A . . . 156N on one of the physical devices 154A . . . 154N. The data for the logical volume is then transferred back, i.e., recalled, from the corresponding physical volume 156A . . . 156N. In certain implementations, recall operations can take several minutes, the recall latency may include the time for a robotic arm to access a tape cartridge and insert the tape cartridge into a tape drive, and the recall latency may include the time to locate the tape to a desired location.

The storage manager 130 maps a plurality of logical volumes 162 within cache 160 to a plurality of logical (virtual) devices. The hosts 102 perform I/O operations by accessing logical (virtual) volumes in the logical devices via the VTS 110. The storage manager 130 maps the logical volumes 162 to the physical volumes 156A . . . 156N. Although the hosts 102 access data via logical volumes and logical devices, the data is physically stored in the physical volumes 156A . . . 156N mountable on the physical devices 154A . . . 154N.

The logical volumes 162A . . . 162N corresponding to the physical volumes 156A . . . 156N may be resident in the cache 160. In FIG. 3, the cache 160 contains logical volumes 162A . . . 162N. The logical volumes resident on the cache 160 may change over time. The storage manager 130 attempts to keep the more likely to be used logical volumes in the cache 160.

When a host 102 writes a logical volume to the VTS 110, the data is stored as a file in the cache 160. The cached data is later premigrated onto a physical volume 156A . . . 156N. The original logical volume is left in the cache 160 for cache hits. When the cache 160 fills to a predetermined threshold, the logical volume data for a selected logical volume 162A . . . 162N is removed from the cache to free space for more logical volumes. In certain implementations, the storage manager 130 removes from the cache 160 a selected logical volume 162A . . . 162N that has been resident on the cache 160 for the longest period of time (i.e., the least recently used logical volume).

An example of a standard write sequence 400 that may be used by VTS 110 to write data is illustrated in flowchart 400 shown in FIG. 4. The write sequence process begins at step 405 where device driver CADD 116 receives a mount command and subsequent write commands with data for tape daemons 118A . . . 118N from host(s) 102. At step 407, storage manager 130 mounts the requested logical volume for writing. Mounting a logical volume may comprise: opening, locating, rewinding or any other operation that places the logical volume in a state to read or write data in the correct location relative to the beginning of the logical volume. Host(s) 102 may send the write command in the form of a data object and a storage request. The data object may comprise a logical volume, record, file, physical volume, cylinder, logical or physical device, surface, sector, page, byte, bit, or any other appropriate unit of data. At step 410, tape daemons 118A . . . 118N receive the data and forward the data to storage manager 130. At step 415, storage manager 130 writes the data object to DASD cache 160 and/or base storage physical volumes 156. Whether data is written to cache, base storage, or both is determined by the controller's pre-programmed data management strategy, which may include various alternatives such as (1) always storing received data objects on cache and occasionally copying or removing cached data objects to base storage, (2) storing received data objects in base storage and only caching the data objects that are most frequently used or likely to be used, (3) another known or novel approach. Storage manager 130 also makes an entry in a metadata database that may or may not be stored in cache 160. The entry in the metadata database cross-references the data object with metadata, which is discussed in greater detail below. Copying of the data object between primary and backup storage sites may also occur in step 415, or at another suitable time.

Until step 420 determines that the write operation is complete, step 420 repeats steps 410-415 as necessary. When the write operation finishes, step 420 advances to step 425. At step 425, storage manager 130 encapsulates the current data object's metadata. Encapsulation of the metadata involves collecting various metadata subcomponents and combining them into a suitable form for storage. Such encapsulation may entail concatenation, aggregation, encoding the parts together into a unified form, encrypting, etc. The metadata subcomponent relative to the present invention is a device specific information data request flag (explained below with reference to step 723). The metadata is associated with the logical volume where the corresponding data is stored. Step 430 writes the metadata to the cache 160 and/or another storage location, along with the data object written in step 415, depending upon the type of data management strategy in place. After step 430, the write sequence 400 ends in step 435.

As an alternative, step 410 may encapsulate the metadata with its corresponding data object, and write the encapsulated result in step 415. In this case, step 410 buffers received data for subsequent writing to storage in step 415. The data object and metadata may be encapsulated, for example, by concatenation, aggregation, encoding the parts together into a unified form, encrypting, etc.

An example of a standard read sequence that may be used by VTS 110 to read data is illustrated in flowchart 500 shown in FIG. 5. The process of flowchart 500 is only one example of a process for obtaining information from a data storage device, other processes may be used without limitation. The read sequence 500 is started when device driver CADD 116 receives a mount request from host(s) 102 for a specific logical volume 162. In response, device driver CADD 116 forwards the read request to tape daemons 118A . . . 118N and storage manager 130. At step 507, storage manager 130 mounts the physical tape cartridge 156 associated with the requested logical volume for reading if the logical volume is not already resident in cache 160. Mounting a logical volume may comprise: opening, locating, rewinding or any other operation that places the logical volume in a state to read or write data in the correct location relative to the beginning of the logical volume. At step 510 the data and metadata for the logical volume are read. At step 515 the data read is returned to the host 102. At step 520 the status of the reading of the requested logical volume is examined to determine if the read is complete. If the read is complete then control transfers to step 535. If the read is not complete then steps 510, 515 and 520 are executed until the read is complete. The process ends at step 535.

Figure 6:
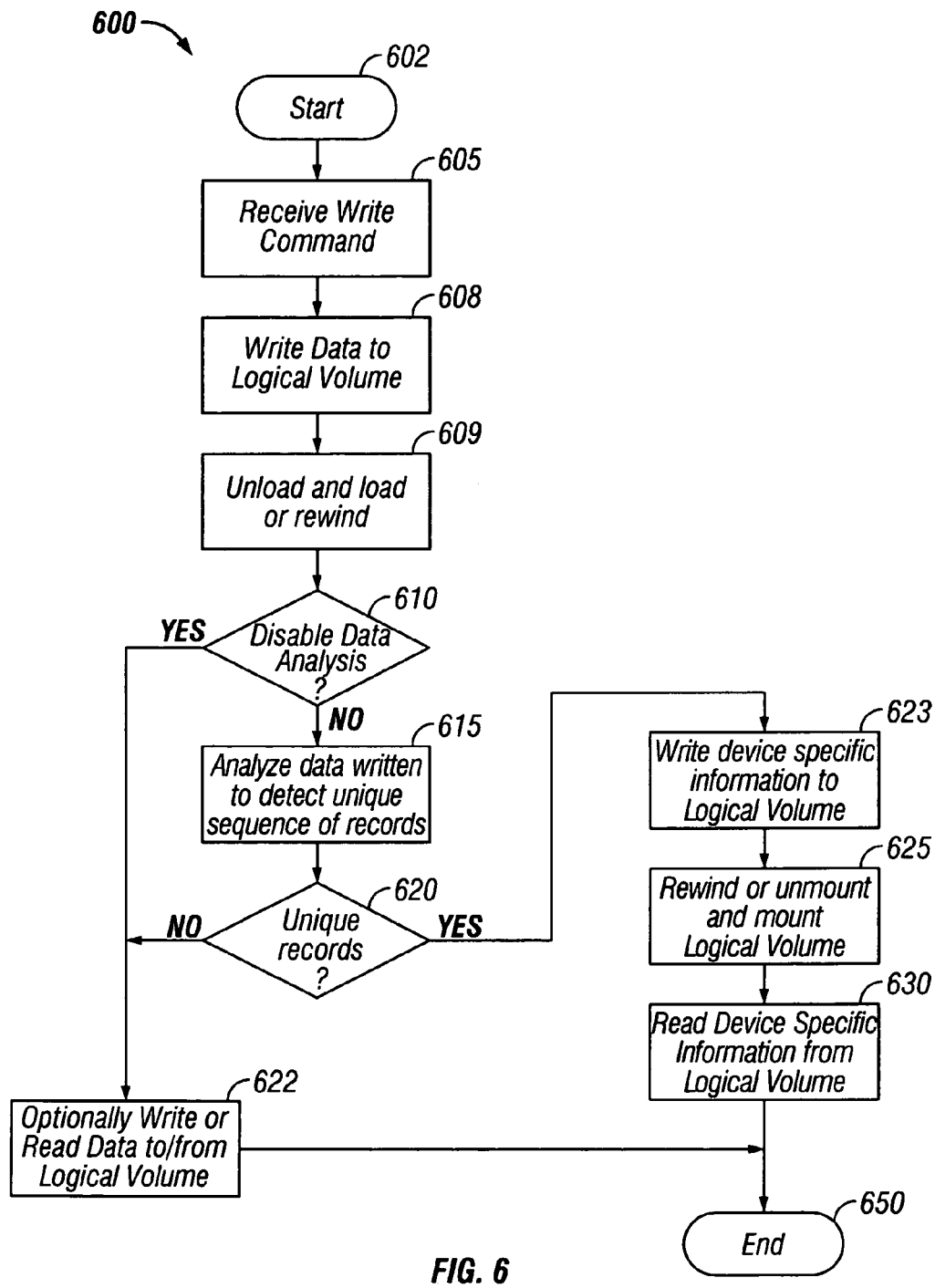
FIG. 6 illustrates a flowchart of one embodiment of the present invention to obtain data storage device specific information.

An example of the operation of one embodiment of the present invention for obtaining information from a data storage device is now described with reference to FIG. 6. The process begins with step 602. Step 602 flows to step 605, where the data storage device, for example, VTS 110 receives a write command to write data to a logical volume. The logical volume may be any logical volume(s) managed by or associated with VTS 110. Multiple logical volumes may be written to simultaneously, without limitation. The write command is received from an external device(s), for example, host(s) 102. Other external devices may send a write command to the data storage device, for example, clients, servers, another VTS, an automated data storage library, etc., without limitation. The process flows to step 608 where the data associated with the write command is written to the logical volume. The data may be normal data or the data written may be data comprising a unique sequence of records, where the unique sequence of records may be used to indicate that device specific information is requested (explained below). The write process shown in flowchart 400 (FIG. 4) may be used to write the data or other procedures for writing data may be used. After completion of writing the data, the process flows to step 609 where the logical volume is either rewound or unloaded and loaded. The actions of step 609 are executed to prepare the logical volume to read data. After completion of step 609, the process flows to step 610 where VTS 110 determines if an analysis of the data written needs to be performed. Step 610, determines if data analysis step 615 needs to be executed. Data analysis step 615 may be disabled or enabled at step 610, by for example, using operator interface 105 coupled to the data storage device. Step 610 may be performed by an internal software switch, hardware logic, processing element etc. Operator interface 105 may be used to enable or disable the data analysis at step 610, or at any step of the execution of process 600. For example, an operator may enter a command using a secure protocol, (e.g. username and password) at operator interface 105 to either enable or disable the data analysis at step 610. Other means or interfaces may be used, for example, a remote login to VTS 110 using a remote computer or other data processing device to enable or disable the data analysis at step 610. If at step 610 the data analysis is disabled, then control flows to step 622 where the data that was previously stored may be read from the logical volume. Alternatively data may be written to the logical volume at step 622. A read or write operation at step 622 may be the result of a read or write request from host(s) 102. The read or write request may additionally comprise an unmount, mount or rewind operation for the logical volume. The read or write processes shown in flowchart 500 (FIG. 5) and flowchart 400 (FIG. 4) may be used to read or write the data or other procedures for reading and writing data may be used. Alternatively, step 622 need not be executed. After execution of step 622, control flows to step 650 where the process ends. Step 622 may or may not be executed depending upon if it is necessary to read data at this time or if it is advantageous to read the data at another time.

If at step 610 the data analysis is enabled, then control flows to step 615 where the data written to the logical volume is analyzed to detect a unique sequence of records. The data may be analyzed by reading the data on the logical volume, storing the data in temporary storage for analysis, intercepting the data as it is being stored, etc. The data analyzed may consist of the entire sequence of data written by the host 102 or specific subsets thereof. The data storage device (i.e. VTS 110) may analyze the data written to the logical volume to detect the unique sequence of records or other processing elements or devices associated with VTS 110 may be used. The unique set of records is used to indicate that a request for device specific information from the data storage device is requested by host(s) 102. The unique set of records is a specific pattern of data that has a low probability of existing for normal data written to a logical volume. An example of a unique set of records is: a volume header; a first dataset header; a second dataset header; a first tape mark; a key record; a query identifier record; a second tape mark; a volume trailer; a first volume end of file; a second volume end of file; a third tape mark; and a fourth tape mark. Volume headers, dataset headers, tape marks, end of file records and volume trailers are industry standard methods of identifying tape volumes (definitions are available from "DFSMS: using magnetic tape", IBM publication # SG26-7412).

Other unique sets of records than described above may be used with the present invention without limitation. The unique sets of records should be a pattern of data that has a low probability of occurrence in normal data written to a logical volume.

If at step 620 the unique set of records is not detected on the logical volume, then control flows to step 622 where the data that was previously stored may be read from the logical volume. The above description for step 622 applies at this execution also. After execution of step 622, control flows to step 650 where the process ends. Step 622 may or may not be executed depending upon if it is necessary to read data at this time or if it is advantageous to ready the data at another time. If at step 620 the unique set of records is detected on the logical volume, then the process flows to step 623 where the unique set of records written to the logical volume is appended to, replaced, or changed to reflect device specific information. This may be accomplished by the data storage device (i.e. VTS 100) detecting the unique sequence of records on at least one logical volume, and then writing data storage device specific information on the logical volume. Also at step 623, VTS 110 notifies host(s) 102 that the device specific information stored on the logical volume is now available to read. The device specific information may comprise various forms of information about VTS 110, logical or physical volumes, associated storage devices (i.e. tape drives, Library 150, etc.). The device specific information may comprise a list of attributes of metadata associated with a logical volume. For example, the attributes of metadata may comprise a list of data version levels used to synchronize copies of logical volumes between two VTSs combined into a Peer-to-Peer VTS subsystem. The attributes of metadata could also comprise a list of host constructs that control which pools of physical tape cartridges each logical volume is associated with. The attributes of metadata may comprise statistical information about the data or other information relative to the data, without limitation. The device specific information may comprise a report of an operational history of the data storage device, for example, VTS 110. The operational history of the data storage device may comprise information regarding data stored or retrieved, power up/down sequences, performance history of the VTS, and usage of the subsystems that comprise the VTS, such as the cache 160 or the tape drives 154. The form of the report of operational history may take various forms, for example, a simple list, graphical depictions, interactive data file, etc. The device specific information may comprise a report of the operational states of the data storage device, for example, VTS 110. The operational states of the data storage device may comprise information regarding the present state of data stored or retrieved, power up/down sequence states, and availability status of the subsystems that comprise the VTS, such as the cache 160 or the tape drives 154. The form of the report of operational states may take various forms, for example, a simple list, graphical depictions, interactive data file, etc. The device specific information may comprise a list of the physical location of a logical volume stored in the data storage device. For example the physical location of a logical volume may reside in one or more physical devices 154, physical volumes 156, tape drives 154A-154N, tape cartridges 156A-156N, DASD 160 or other devices associated with VTS 110. The form of the a list of the physical locations may take various forms, for example, a simple list, graphical depictions, interactive data file, etc.

After execution of step 623, control flows to step 625. At step 625 the logical volume where the device specific information was written to is mounted. Mounting of the logical volume at step 625, may additionally comprise: opening the logical volume; rewinding of the logical volume; or any other operation upon the logical volume that places the logical volume in a state such that data can be read from the logical volume. Mounting the logical volume may be the result of VTS 110 receiving a read command (i.e. process 500, FIG. 5) from an external device, for example, host(s) 102. Mounting the logical volume may also include retrieving the entire contents of the logical volume into the cache 160 from the physical tape drive 154, verifying the correct logical volume is being accessed by checking either the volume data or the volume metadata, and verifying the integrity of the logical volume using error detecting or correcting codes. After mounting logical volume at step 625, control flows to step 630 where the data storage device (i.e. VTS 110) reads the device specific information from the logical volume. The information read is transmitted to the device requesting the information, for example, host(s) 102. The reading of the device specific information may comprise: reading a volume header; reading a first dataset header; reading a second dataset header; reading a first tape mark; reading a report header; reading at least one report data record; reading a second tape mark; reading a volume trailer; reading a first volume end of file; reading a second volume end of file; reading a third tape mark; and reading a fourth tape mark. The reading of at least one report data may include any of the following (explained above): a list of attributes of metadata associated with the logical volume in the data storage device; a report of an operational history of the data storage device; a report of operational states of the data storage device; and a list of the physical location of the logical volume in the data storage device. After execution of step 630, control transfers to step 650 where the process ends.

Figure 7:
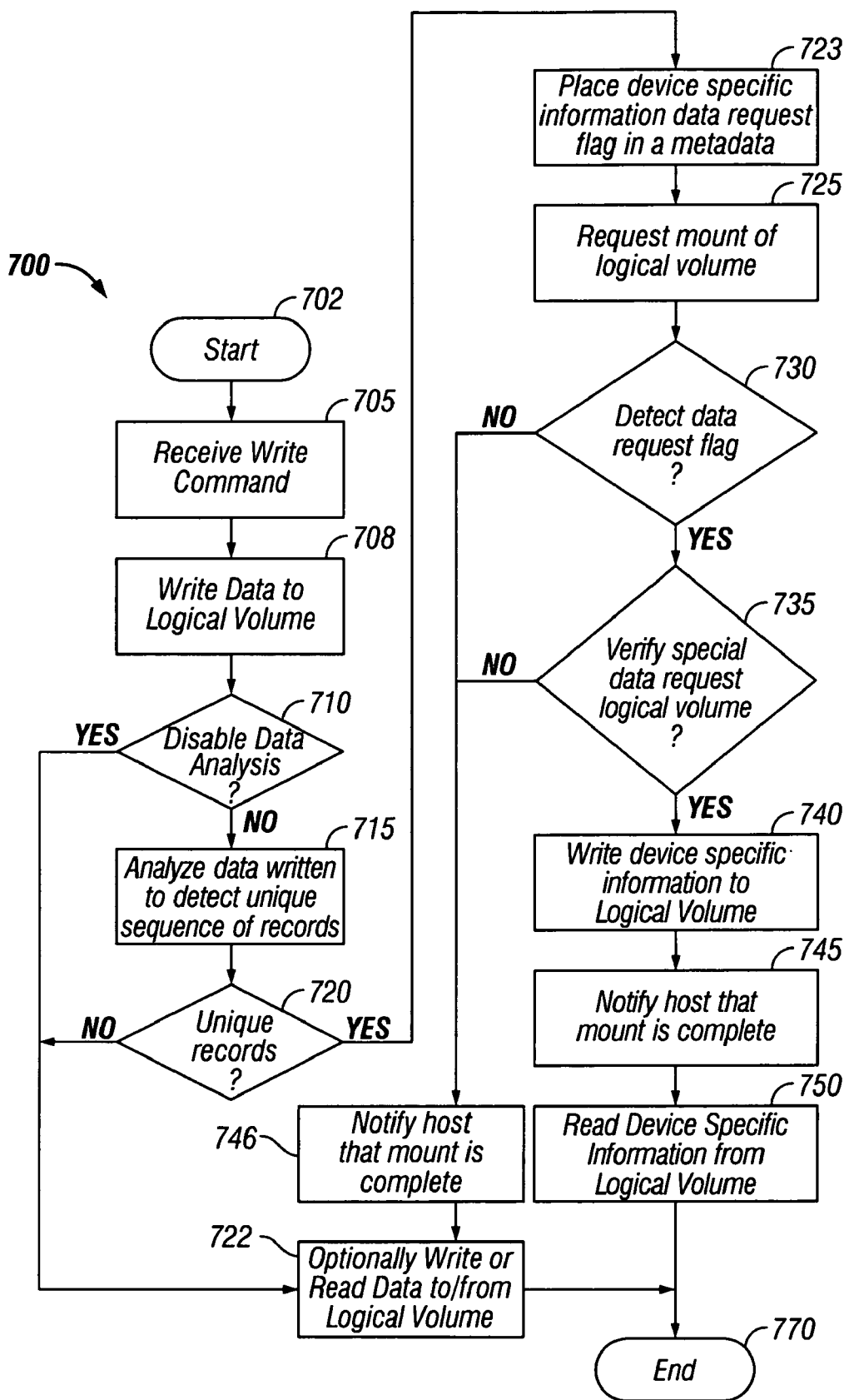
FIG. 7 illustrates a flowchart of a second embodiment of the present invention to obtain data storage device specific information.

An example of the operation of a second embodiment of the present invention for obtaining information from a data storage device is now described with reference to FIG. 7. The process begins with step 702. Step 702 flows to step 705, where the data storage device, for example, VTS 110 receives a write command to write data to a logical volume. The logical volume may be any logical volume(s) managed by or associated with VTS 110. Multiple logical volumes may be written to simultaneously, without limitation. The write command is received from an external device(s), for example, host(s) 102. Other external devices may send a write command to the data storage device, for example, clients, servers, another VTS, an automated data storage library, etc., without limitation. The process flows to step 708 where the data associated with the write command is written to the logical volume. The data may be normal data or the data written may be data comprising a unique sequence of records, where the unique sequence of records may be used to indicate that device specific information is requested (explained below). The write process shown in flowchart 400 (FIG. 4) may be used to write the data or other procedures for writing data may be used After completion of writing the data, the process flows to step 710 where VTS 110 determines if an analysis of the data written needs to be performed. Step 710, determines if data analysis step 715 needs to be executed. Data analysis step 715 may be disabled or enabled at step 710, by for example, using operator interface 105 coupled to the data storage device. Step 710 may be performed by an internal software switch, hardware logic, processing element etc. Operator interface 105 may be used to enable or disable the data analysis at step 710, or at any step of the execution of process 700. For example, an operator may enter a command using a secure protocol, (e.g. username and password) at operator interface 105 to either enable or disable the data analysis at step 710. Other means or interfaces may be used, for example, a remote login to VTS 110 using a remote computer or other data processing device to enable or disable the data analysis at step 710. If at step 710 the data analysis is disabled, then control flows to step 722 where the data that was previously stored may be read from the logical volume. Alternatively data may be written to the logical volume at step 722. A read or write operation at step 722 may be the result of a read or write request from host(s) 102. The read or write request may additionally comprise an unmount, mount or rewind operation for the logical volume. The read process shown in flowchart 500 (FIG. 5) may be used to read the data or other procedures for reading data may be used. Alternatively, step 722 need not be executed. After execution of step 722, control flows to step 770 where the process ends. Step 722 may or may not be executed depending upon if it is necessary to read data at this time or if it is advantageous to ready the data at another time. If at step 710 the data analysis is enabled, then control flows to step 715 where the data written to the logical volume is analyzed to detect a unique sequence of records. The data may be analyzed by reading the data on the logical volume, storing the data in temporary storage for analysis, intercepting the data as it is being stored, etc. The data analyzed may consist of the entire sequence of data written by the host 102 or specific subsets thereof. Storage device (i.e. VTS 110) may analyze the data written to the logical volume to detect the unique sequence of records or other processing elements or devices associated with VTS 110 may be used. The unique set of records is used to indicate that a request for device specific information from the data storage device is requested by host(s) 102. The unique set of records is a specific pattern of data that has a low probability of existing for normal data written to a logical volume. An example of a unique set of records is: a volume header; a first dataset header; a second dataset header; a first tape mark; a key record; a query identifier record; a second tape mark; a volume trailer; a first volume end of file; a second volume end of file; a third tape mark; and a fourth tape mark. Volume headers, dataset headers, tape marks, end of file records and volume trailers are industry standard methods of identifying tape volumes. Other unique sets of records than described above may be used with the present invention without limitation. The unique sets of records should be a pattern of data that has a low probability of occurrence in normal data written to a logical volume. If at step 720 the unique set of records is not detected on the logical volume, then control flows to step 722 where the data that was previously stored may be read from the logical volume. The above descriptions for the operation of steps 622 and 722 apply also to this execution of step 722. After execution of step 722, control flows to step 770 where the process ends. Step 722 may or may not be executed depending upon if it is necessary to read data at this time or if it is advantageous to ready the data at another time.

In response to the data storage device detecting the unique sequence of records on the logical volume at step 720, the data storage device (i.e. VTS 110) places a device specific information data request flag in the metadata associated with the logical volume at step 723 to indicate that the logical volume comprises device specific information and that the logical volume is a special data request logical volume. After execution of step 723 control flows to step 725 where host(s) 102 requests the data storage device (i.e. VTS 110) to mount the logical volume to prepare to read the logical volume. Mounting of the logical volume begins after receiving the request at step 725. Mounting of the logical volume may additionally comprise: opening the logical volume; rewinding of the logical volume; or any other operation upon the logical volume that places the logical volume in a state such that data can be read from the logical volume. After receiving the request to mount the logical volume at step 725, the data storage device (i.e. VTS 110) reads and examines the metadata associated with the logical volume to detect the device specific information data request flag. In response to detecting the device specific information data request flag in the metadata at step 730, control flows to step 735 to verify that the logical volume is a special data request logical volume. As described above with reference to step 723, a logical volume that comprises device specific information is a special data request logical volume. Verifying that the logical volume is a special data request logical volume may comprise reading the logical volume to detect a unique set of records, device specific information or other data that may be used for verification purposes, without limitation. Alternatively the verification (step 735) may not be executed because detecting the device specific information data request flag in the metadata is sufficient to verify that the logical volume is a special data request logical volume.

If the device specific information data request flag is not detected at step 730, then control flows to step 746 where VTS 110 notifies host(s) 102 that the mounting of the logical volume is complete. After execution of step 746 control flows to step 722 (previously described above) to optionally read data from the logical volume. After verifying that the logical volume is a special data request logical volume at step 735, control flows to step 740 to write the device specific information on the logical volume. If the VTS 110 does not verify that the logical volume is a special data request logical volume at step 735, then control flows to step 746 where VTS 110 notifies host(s) 102 that the mounting of the logical volume is complete. After execution of step 746 control flows to step 722 (previously described above) to optionally read data from the logical volume.

At step 740 the unique set of records that was previously written to the logical volume at step 708 is appended to, replaced, or changed to reflect device specific information. This may be accomplished by the data storage device (i.e. VTS 110) writing data storage device specific information on the logical volume. As described above for the first embodiment, the device specific information may comprise various forms of information about VTS 110, logical or physical volumes, associated storage devices (i.e. tape drives, library 150, etc.). The device specific information may comprise a list of attributes of metadata associated with a logical volume. For example, the attributes of metadata may comprise a list of data version levels used to synchronize copies of logical volumes between two VTSs combined into a Peer-to-Peer VTS subsystem. The attributes of metadata could also comprise a list of host constructs that control which pools of physical tape cartridges each logical volume is associated with. The attributes of metadata may comprise statistical information about the data or other information relative to the data, without limitation. The device specific information may comprise a report of an operational history the data storage device, for example, VTS 110. The operational history of the data storage device may comprise information regarding data stored or retrieved, power up/down sequences, performance history of the VTS, and usage of the subsystems that comprise the VTS, such as the cache 160 or the tape drives 154. The form of the report of operational history may take various forms, for example, a simple list, graphical depictions, interactive data file, etc. The device specific information may comprise a report of the operational states of the data storage device, for example, VTS 110. The operational states of the data storage device may comprise information regarding the state of data stored or retrieved, power up/down sequence status, and availability status of the subsystems that comprise the VTS, such as the cache 160 or the tape drives 154. The form of the report of operational states may take various forms, for example, a simple list, graphical depictions, interactive data file, etc. The device specific information may comprise a list of the physical location of a logical volume stored in the data storage device. For example the physical location of a logical volume may reside in one or more physical devices 154, physical volumes 156, tape drives 154A-154N, tape cartridges 156A-156N, DASD 160 or other devices associated with VTS 110. The form of the a list of the physical locations may take various forms, for example, a simple list, graphical depictions, interactive data file, etc. After execution of step 740, control flows to step 745.

At step 745, the data storage device (i.e. VTS 110) notifies host(s) 102 that mounting of the logical volume where the device specific information is complete to enable host(s) 102 to read the device specific information. Completion of mounting of the logical volume at step 745, may additionally comprise: unmounting and mounting of the logical volume; rewinding of the logical volume; or any other operation upon the logical volume that places the logical volume in a state such that data can be read from the logical volume. After execution of step 745, control flows to step 750. At step 750 the logical volume where the device specific information was written to is read. The information read is transmitted to the device requesting the information, for example, host(s) 102. Reading the device specific information from logical volume may be the result of VTS 110 receiving a read command (i.e. process 500, FIG. 5) from an external device, for example, host(s) 102. Reading of the device specific information may comprise: reading a volume header; reading a first dataset header; reading a second dataset header; reading a first tape mark; reading a report header; reading at least one report data record; reading a second tape mark; reading a volume trailer; reading a first volume end of file; reading a second volume end of file; reading a third tape mark; and reading a fourth tape mark. The reading of at least one report data may include any of the following (explained above): a list of attributes of metadata associated with the logical volume in the data storage device; a report of an operational history of the data storage device; a report of operational states of the data storage device; and a list of the physical location of the logical volume in the data storage device. After execution of step 750, control transfers to step 770 where the process ends.

The above descriptions of the operation of the present invention proceeded using VTS 110 as the data storage device. The data storage device used to implement the present invention may also be an automated data storage library (i.e. physical library 150). As described above physical library 150 comprises: data storage media for storage of data (i.e. physical volumes 156), data storage drives (i.e. physical devices 154) for reading and writing data with respect to the data storage media and a library controller (i.e. library manager 152) for controlling the automated data storage library.

Additional Implementation Details

The described techniques for maintaining information on network components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, certain variables, such as N are used to denote integer values indicating a certain number of elements. These variables may denote any number when used at different instances with the same or different elements. For example, in FIG. 3, for logical volumes 162A . . . N, N may represent Q number of elements; while for physical devices 154A . . . N, N may represent M number of elements; and, for physical volumes 156A . . . N, N may represent P number of elements.

The logic of FIGS. 4, 5, 6 and 7 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The logic of FIGS. 4, 5, 6 and 7 was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

Figure 8:
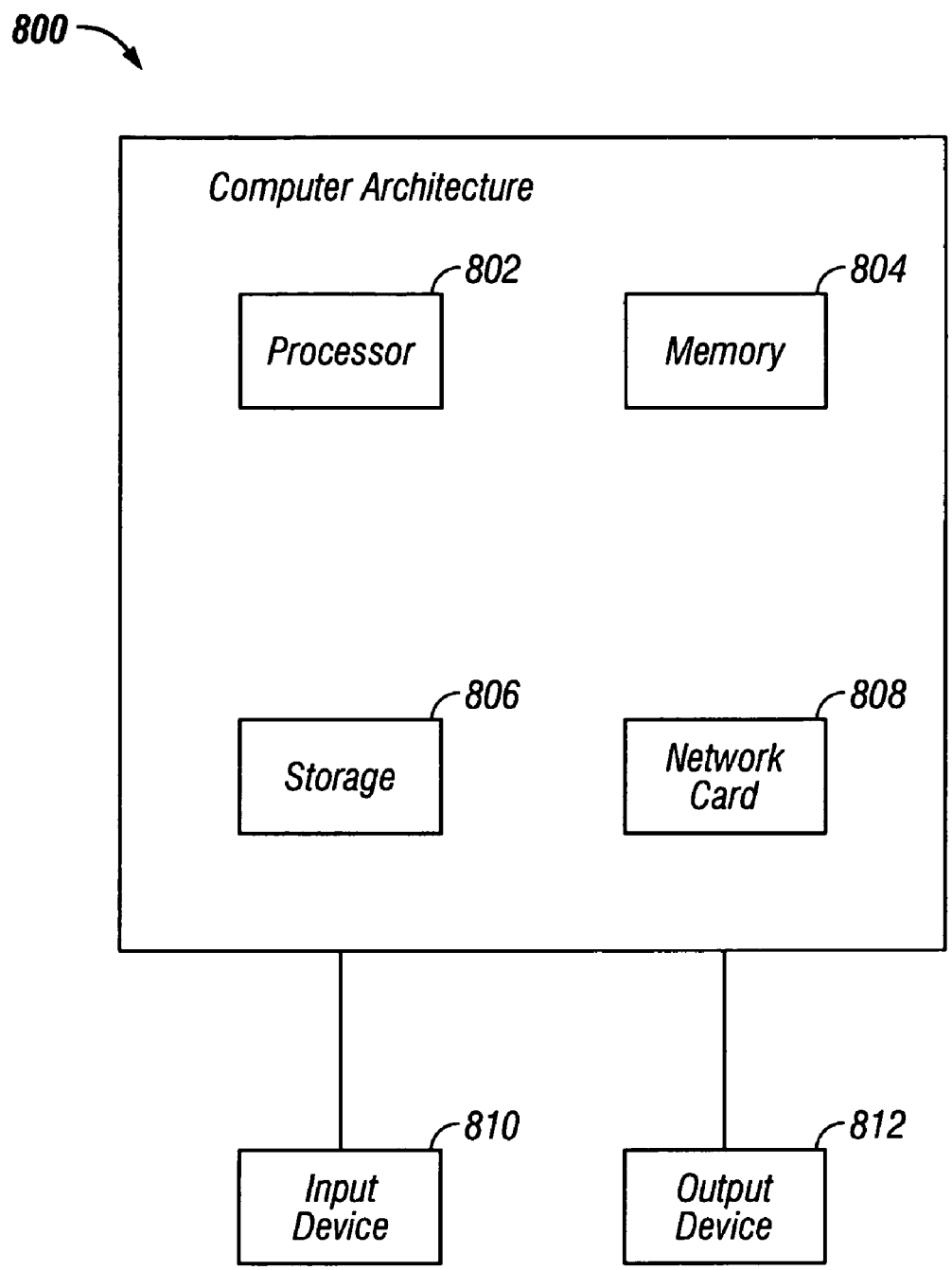
FIG. 8 illustrates, in a block diagram, one implementation of the architecture of hosts, operator interfaces and VTS that may be used for the present invention.

FIG. 8 illustrates one implementation of the architecture of host(s) 102, operator interfaces 105, and VTS 110. Host(s) 102, operator interfaces 105, and VTS 110 may implement a computer architecture 800 having a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

While the hosts 102 and the VTS 110 communicate within a client-server paradigm in the described implementations, the hosts 102 and the VTS 110 may also communicate within a peer-to-peer or any other paradigm known in the art. Furthermore, many of the software and hardware components have been described in separate modules for purposes of illustration. Such components may be integrated into a fewer number of components or divided into a larger number of components. Additionally, certain operations described as performed by a specific component may be performed by other components.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended. The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for obtaining information from a data storage device, comprising:

writing data, said data comprising a unique sequence of records that is a single specific pattern, which pattern has a low probability of existing for normal data written to a logical volume, to at least one logical volume on said data storage device using standard write commands;

rewinding or demounting said at least one logical volume;

after rewinding or demounting said at least one logical volume, locating or mounting said at least one logical volume;

after said locating or mounting said at least one logical volume, accessing said at least one logical volume and analyzing said data written to said at least one logical volume to detect said single specific pattern of said unique sequence of records apart from normal data written to a logical volume, wherein said analyzing is performed by said data storage device;

in response to said data storage device detecting said unique sequence of records on said at least one logical volume, writing data storage device specific information on said at least one logical volume, wherein said writing data storage device information on at least one logical volume comprises replacing said data comprising said unique sequence of records; and placing said at least one logical volume in a state such that said replacing data storage device information can be read.

2. The method of claim 1, wherein said analyzing step is disabled or enabled using an operator interface coupled to said data storage device.

3. The method of claim 1, wherein said writing data comprising a unique sequence of records further comprises:

writing a volume header;
writing a first dataset header;
writing a second dataset header;
writing a first tape mark;
writing a key record;
writing a query identifier record;
writing a second tape mark;
writing a volume trailer;

writing a first volume end of file;
writing a second volume end of file;
writing a third tape mark; and
writing a fourth tape mark.

4. A system for obtaining information from a device, comprising:
a host computer;
a data storage device comprising:
a cache memory;
at least one logical volume;
a central processing unit for controlling said data storage device; and
a host computer interface coupled to said host computer for interfacing said data storage device to said host computer, wherein said host computer is configured to write data, said data comprising a unique sequence of records comprising a specific pattern of data that is a single specific pattern, which pattern has a low probability of existing for normal data written to a logical volume, to said at least one logical volume on said data storage device using standard write commands, said storage device configured to rewind or demount said at least one logical volume after said logical volume has been written to, said storage device configured to locate or mount said at least one logical volume after said rewind or demount, said storage device configured to access and analyze said data written to said at least one logical volume to detect said single specific pattern of said unique sequence of records apart from normal data written to a logical volume after said locate or mount, and in response to said data storage device detecting said unique sequence of records on said at least one logical volume, said data storage device is configured to write data storage device specific information on said at least one logical volume, wherein said data storage device is configured to write said data storage device specific information on said at least one logical volume by replacing said data comprising said unique sequence of records; and to place said at least one logical volume in a state such that said replacing data storage device information can be read.

5. The system of claim 4, further comprising an operator interface coupled to said data storage device, wherein said operator interface is configured to enable or disable said data storage device to analyze said data written to said at least one logical volume.

6. A data storage device, comprising:
a cache memory;
at least one logical volume;
a central processing unit for controlling said data storage device; and
a host computer interface coupled to a host computer for interfacing said data storage device to said host computer, wherein said host computer is configured to write data, said data comprising a unique sequence of records comprising a specific pattern of data that is a single specific pattern, which pattern has a low probability of existing for normal data written to a logical volume, to said at least one logical volume on said data storage device using standard write commands;
said central processing unit of said storage device configured to rewind or demount said at least on logical volume after said logical volume has been written to, said storage device configured to locate or mount said logical volume after said rewind or demount, said storage device configured to access and analyze said data written to said at least one logical volume to detect said single specific pattern of said unique sequence of records apart from normal data written to a logical volume after said locate or mount, and in response to said data storage device detecting said unique sequence of records on said at least one logical volume, said central processing unit of said data storage device is configured to write data storage device specific information on said at least one logical volume, wherein said central processing unit of said data storage device is configured to write said data storage device specific information on said at least one logical volume by replacing said data comprising said unique sequence of records; and to place said at least one logical volume in a state such that said replacing data storage device information can be read.

7. The data storage device of claim 6, further comprising an operator interface coupled to said data storage device, wherein said operator interface is configured to enable or disable said data storage device to analyze said data on said at least one logical volume.

8. The data storage device of claim 6, wherein said unique sequence of records comprises:
a volume header;
a first dataset header;
a second dataset header;
a first tape mark;
a key record;
a query identifier record;
a second tape mark;
a volume trailer;
a first volume end of file;
a second volume end of file;
a third tape mark; and
a fourth tape mark.

9. An article of manufacture comprising a data storage medium tangibly embodying a program of machine-readable instructions executable by a digital processing apparatus to perform method steps for obtaining information from a data storage device, comprising:
writing data, said data comprising a unique sequence of records comprising a specific pattern of data that is a single specific pattern, which pattern has a low probability of existing for normal data written to a logical volume, to at least one logical volume on said data storage device using standard write commands;
rewinding or demounting said at least one logical volume;
after said rewinding or demounting said at least on logical volume, locating and mounting said at least one logical volume;
after said locating and mounting said at least one logical volume, accessing said at least one logical volume and analyzing said data written to said at least one logical volume to detect said single specific pattern of said unique sequence of records apart from normal data written to a logical volume, wherein said analyzing is performed by said data storage device;
in response to said data storage device detecting said unique sequence of records on said at least one logical volume, writing data storage device specific information on said at least one logical volume, wherein said writing data storage device information on at least one logical volume comprises replacing said data comprising said unique sequence of records; and
placing said at least one logical volume in a state such that said replacing data storage device information can be read.

10. The article of manufacture of claim 9, wherein said analyzing step is disabled or enabled using an operator interface coupled to said data storage device.

11. The article of manufacture of claim 9, wherein said writing data comprising a unique sequence of records further comprises:
- writing a volume header;
- writing a first dataset header;
- writing a second dataset header;
- writing a first tape mark;
- writing a key record;
- writing a query identifier record;
- writing a second tape mark;
- writing a volume trailer;
- writing a first volume end of file;
- writing a second volume end of file;
- writing a third tape mark; and
- writing a fourth tape mark.

* * * * *